(12) United States Patent
Rojas

(10) Patent No.: US 9,606,236 B2
(45) Date of Patent: Mar. 28, 2017

(54) SYSTEM FOR DETECTING PLANTED TREES WITH LIDAR DATA

(71) Applicant: WEYERHAEUSER NR COMPANY, Federal Way, WA (US)

(72) Inventor: Julio C. Rojas, Columbus, MS (US)

(73) Assignee: Weyerhaeuser NR Company, Seattle, WA (US)

( * ) Notice: Subject to any disclaimer, the term of this patent is extended or adjusted under 35 U.S.C. 154(b) by 660 days.

(21) Appl. No.: 13/654,098

(22) Filed: Oct. 17, 2012

(65) Prior Publication Data

US 2014/0107927 A1    Apr. 17, 2014

(51) Int. Cl.
*G06F 19/00*    (2011.01)
*G01S 17/89*    (2006.01)
*G01S 7/487*    (2006.01)

(52) U.S. Cl.
CPC ............ *G01S 17/89* (2013.01); *G01S 7/4876* (2013.01)

(58) Field of Classification Search
USPC .......................................................... 702/5
See application file for complete search history.

(56) References Cited

U.S. PATENT DOCUMENTS

2008/0319668 A1* 12/2008 Welty et al. .................. 701/223

OTHER PUBLICATIONS

Levent GEN, Determination of Wetland Vegetation Height with LIDAR, 2004, p. 63-71.*

US Forest Service Northern Research Station, Urban Tree Canopy Analysis Helps Urban Planners With Tree Planting Campaigns, summer 2011, 6 pages.*
Thomas E. Dilts, Mapping Riparian Vegetation with LIDAR Data, Winter 2010, 5 pages.*
Wenkai Li, A New Method for Segmenting Individual Trees from the Lidar Point Cloud, Photogrammetric Engineering & Remote Sensing, Jan. 2012, p. 75-84.*
Reutebuch, Steve, "LIDAR: An Emerging Tool for Multiple Resource Measurement, Planning and Monitoring", Western Forester, Society of American Foresters, Mar./Apr. 2008, pp. 1-5, vol. 53, US.
Haugerud, Ralph, "A Model Specification for LIDAR Surveys in the Pacific Northwest", Western Forester, Society of American Foresters, Mar./Apr. 2008, pp. 6-7, vol. 53, US.
McFadden, George, "Developing a Stand-Level Inventory Using LIDAR", Western Forester, Society of American Foresters, Mar./Apr. 2008, pp. 8-9, vol. 53, US.
Schiess, Peter, "The Impact of LIDAR Technology on Transportation System Design: Moving from Coarse Topographic Maps to Detailed Digital Elevation Models," Western Forester, Society of American Foresters, Mar./Apr. 2008, pp. 10-13, vol. 53, US.

* cited by examiner

*Primary Examiner* — Tung Lau
(74) *Attorney, Agent, or Firm* — Perkins Coie LLP

(57) ABSTRACT

Disclosed is a system and method for processing LiDAR return data prior to analyzing the data to detect planted trees. LiDAR return data for an area in question is filtered to remove data that are not within a predetermined area of where trees have been planted. Planting data such as GPS data that is collected by tractors or other equipment records the location of where trees are planted. The planting data is used to filter the LiDAR return data by eliminating or ignoring LiDAR return data that are not within a buffer zone around the location where the trees have been planted. Once filtered, the LiDAR return data can be analyzed to detect trees or other items of interest in the LiDAR return data.

10 Claims, 6 Drawing Sheets

SYSTEM FOR DETECTING PLANTED TREES WITH LIDAR DATA

TECHNICAL FIELD

The technology disclosed herein relates to remote sensing of forest lands and in particular to the detection of trees in LiDAR data.

BACKGROUND

As the size of managed forests increase, it is becoming cost prohibitive to physically survey or cruise such lands to gather data that is useful for forest management. As a solution, many forest management companies are turning to the use of remote sensing data such as aerial images or LiDAR data as a substitute to physically inspecting their lands. With LiDAR data, an aircraft, such an airplane or helicopter, is flown over the land while laser pulses are fired at the ground in a repetitive sweeping pattern. A detector on the aircraft measures the time and intensity of the pulses that are reflected from the underlying vegetation, ground etc. Because the altitude and speed of the aircraft are accurately known from GPS information recorded by the aircraft, each returned pulse can be assigned an accurate three-dimensional geographic coordinate. Together the returned LiDAR pulses define a topographic map of the heights of the vegetation or other objects under the aircraft.

While computers can identify trees in LiDAR data that are significantly taller than the surrounding vegetation, individual trees are harder to identify in the LiDAR data when the trees are young or about the same size as the surrounding vegetation. Given this problem, there is need for a technique that can better identify young trees from surrounding vegetation with remotely sensed data.

DETAILED DESCRIPTION

In forest management, there is often a need to be able to quantify how well planted trees are growing. If the trees are not growing as expected, active management techniques such as applying fertilizer or removing competing vegetation may be required. As discussed above, LiDAR is one remote sensing technique that can be used to survey large areas of land in a cost effective manner. The LiDAR return data can be used to identify trees in an area and the detected heights of the trees versus their age can be analyzed to assess how well the trees are growing.

Figure 1:
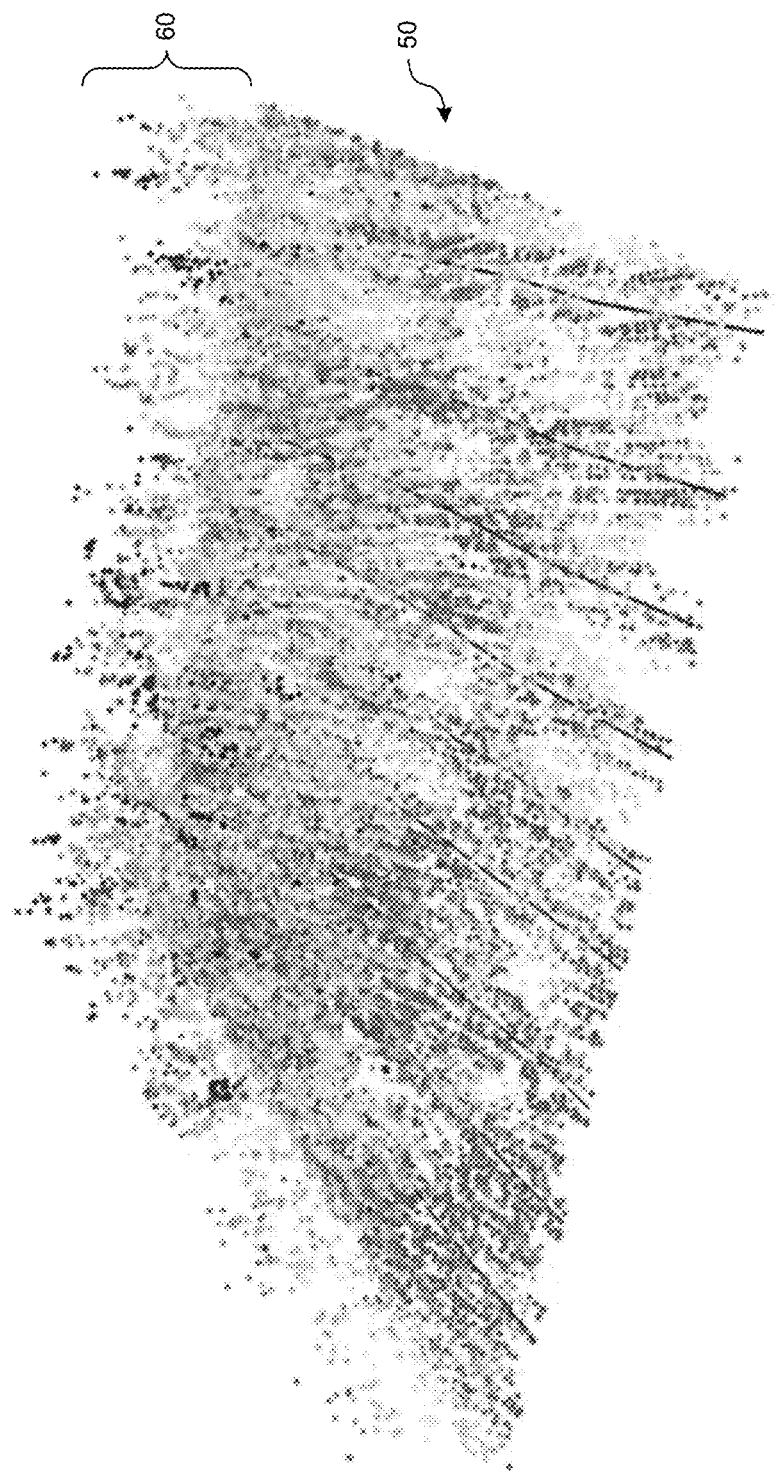
FIG. 1 illustrates LiDAR data returns from planted trees and surrounding vegetation in a managed forest plot.

FIG. 1 illustrates a sampling of LiDAR return data that are obtained for a geographic plot 50 under investigation. The LiDAR return data 60 are color-coded according to their height above the ground with the blue dots being the highest, followed by green dots and then yellow and red dots that are the closest to the ground.

Differentiating the planted trees from the surrounding vegetation in the LiDAR return data may be difficult with a computer because the surrounding vegetation may be as tall as or taller than the planted trees. Therefore, algorithms that detect trees based on the height or shape of the LiDAR returns from the trees compared with neighboring vegetation can be inaccurate.

To address this problem, the disclosed technology uses planting data that indicate where the trees were planted to filter the remote sensing data such as LiDAR return data. In one embodiment, GPS data obtained by tractors or other planting equipment can be used to record the locations of the planted trees. In another embodiment, aerial image or satellite data can be used to determine the planting data.

Tractors or other devices that plant trees in a plot often record GPS data as the trees are being planted. The GPS data that marks the location where the trees were planted are input into a computer system to use as a filter for the LiDAR return data. LiDAR return data for the plot in question that are not in the areas where the trees were planted are removed prior to analyzing the LiDAR data to detect the planted trees. In one embodiment, a filter removes any LiDAR return data that are not coincident with the planting data or within a buffer region. In one exemplary embodiment, the buffer region may extend 1-2 meters on each side of a line on which the trees were planted. The particular size of the buffer region may depend on the type of tree that is planted, the type of vegetation found in the plot or other factors. Once the LiDAR return data have been filtered, the data are then analyzed to identify the planted trees. One suitable method of analyzing LiDAR return data to identify individual trees is disclosed in U.S. Pat. No. 7,474,964 to Welty, which is assigned to Weyerhaeuser NR Company, the assignee of the disclosed application and which is herein incorporated by reference in its entirety.

Figure 2:
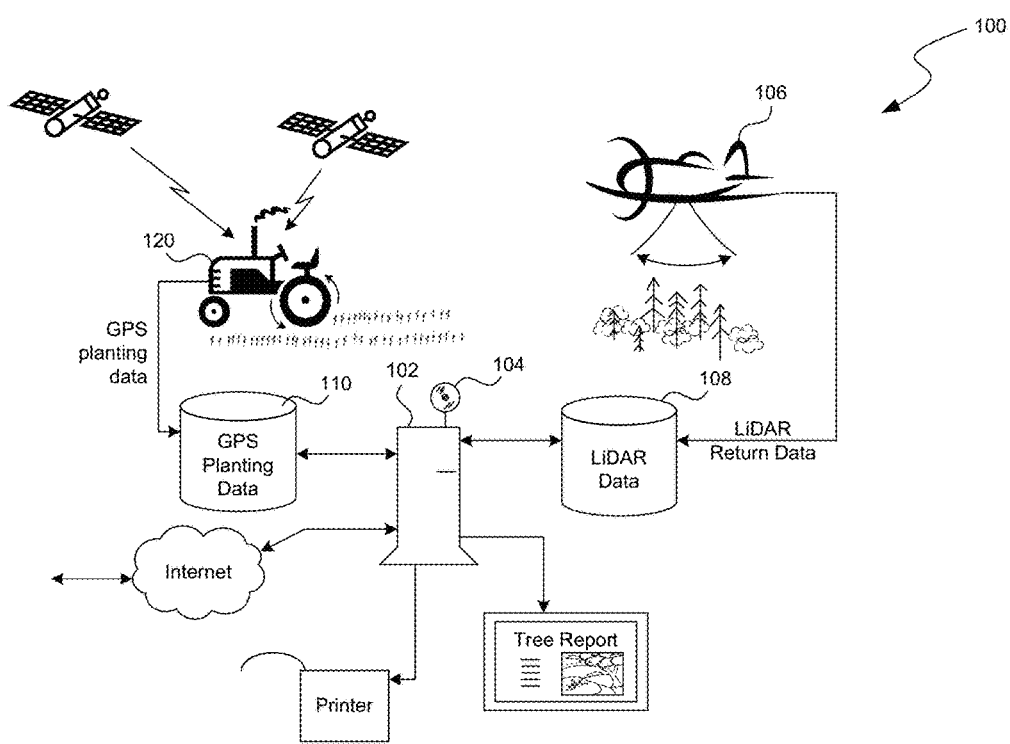
FIG. 2 illustrates a computer system that is configured to detect planted trees in LiDAR return data in accordance with one embodiment of the disclosed technology.

FIG. 2 illustrates a suitable computer system 100 that can be used to improve the detection planted trees with remote sensing data such as LiDAR data. The computer system 100 includes a processor-based computer 102 that is programmed with executable instructions. The instructions may be stored on a non-transitory computer readable media 104 such a CD-ROM, hard drive, flash drive, memory circuit or received from a remote computer system via a wired or wireless computer communication link.

LiDAR return data are obtained from a LiDAR imaging system (not separately shown) that is carried over the land in question by an aircraft 106 or obtained from a satellite or from another computer or the like. The LiDAR return data are stored in a database 108 or other file format for analysis by the computer 102. The computer 102 also receives planting data that are stored in a database 110 or in another file format. In one embodiment, the planting data are obtained from the tractors 120 or other machinery used to plant the trees in the land in question. The tractors include GPS receivers that receive and record location signals from a number of GPS satellites in the conventional manner. The GPS signals obtained while the trees are being planted are supplied to the local or remote database 110. In another embodiment, aerial or satellite images can be analyzed to determine the locations of where the trees have been planted.

The computer 102 reads the planting data that indicates where the trees have been planted in a plot. The computer 102 then uses the planting data to filter the LiDAR return data in order to remove or ignore those LiDAR data points that are not near the locations of where the trees have been planted. In one embodiment, a buffer zone is defined that extends a distance between 0-3 meters and more preferably 0-1 meter on either side of a line where the trees have been planted. LiDAR return data that is outside of the buffer zone are eliminated or ignored by the tree identification algorithms that operate on the LiDAR return data.

In one embodiment, the LiDAR return data outside of the desired buffer zone is physically removed from the LiDAR data set to be analyzed. In another embodiment, the LiDAR return data outside the buffer zones is replace with a zero height value. In yet another embodiment, the LiDAR return data outside of the buffer zones is flagged or otherwise marked in a manner that the computer knows to ignore it in the algorithm that searches for trees in the LiDAR return data.

Once the trees are identified in the LiDAR return data, they can be analyzed to determine if they are growing as expected or if additional measures such as fertilizing the land or thinning the competing vegetation may need to be performed. Tree information can also be used to inform inventory systems on tree characteristics such as trees per acre, average height, diameter etc.

As an alternative to filtering LiDAR return data that are not within the buffer zone of the planting lines, it is also possible to filter the LiDAR return data to remove data that are in the buffer zone. This may be done for example, when it is desired to make estimates of an amount of biomass that is present between the planting rows of a plot. Such biomass may have value for bio-fuels or for other purposes and it may be desirable to estimate how much is present on a plot.

Figure 3:
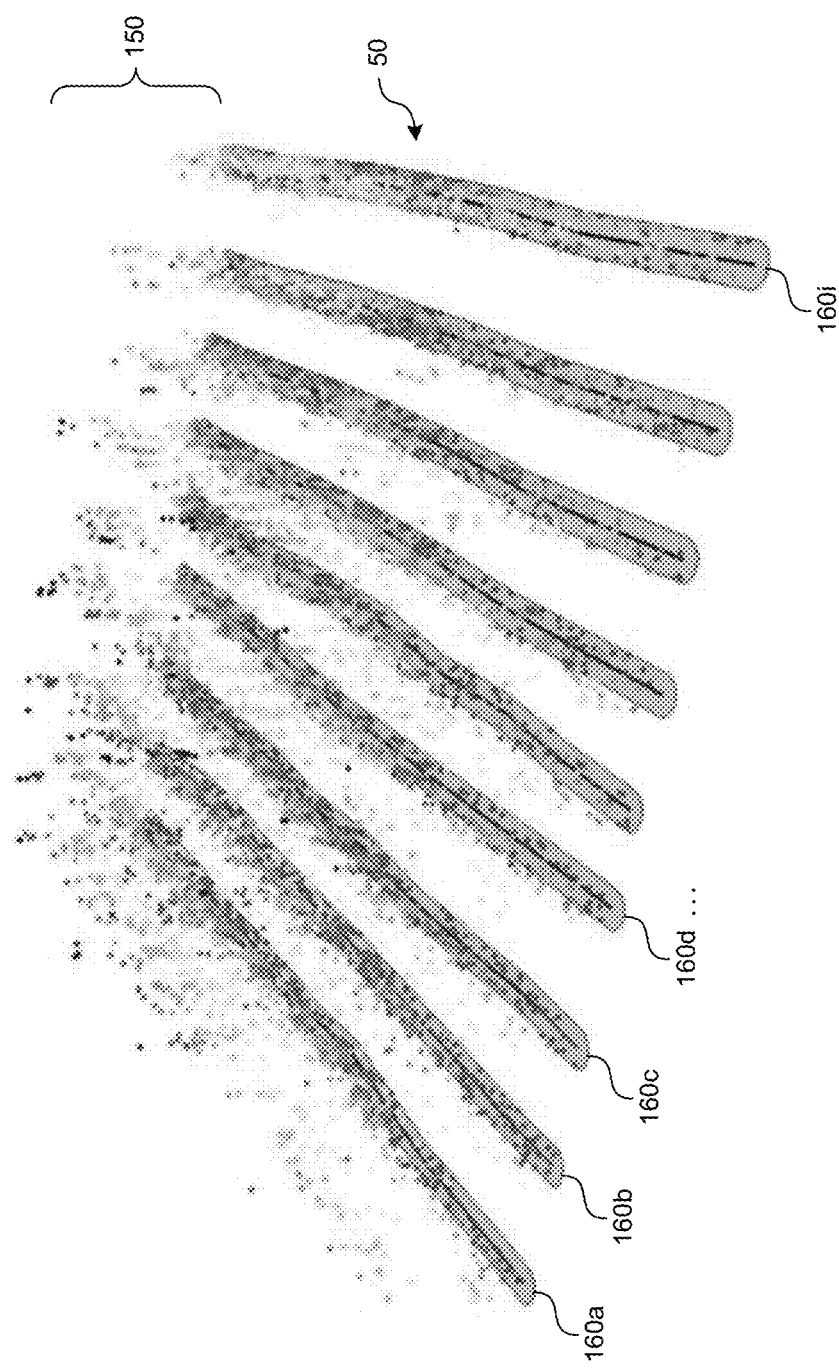
FIG. 3 illustrates LiDAR data that are filtered with planting data in accordance with one embodiment of the disclosed technology.
Figure 4:
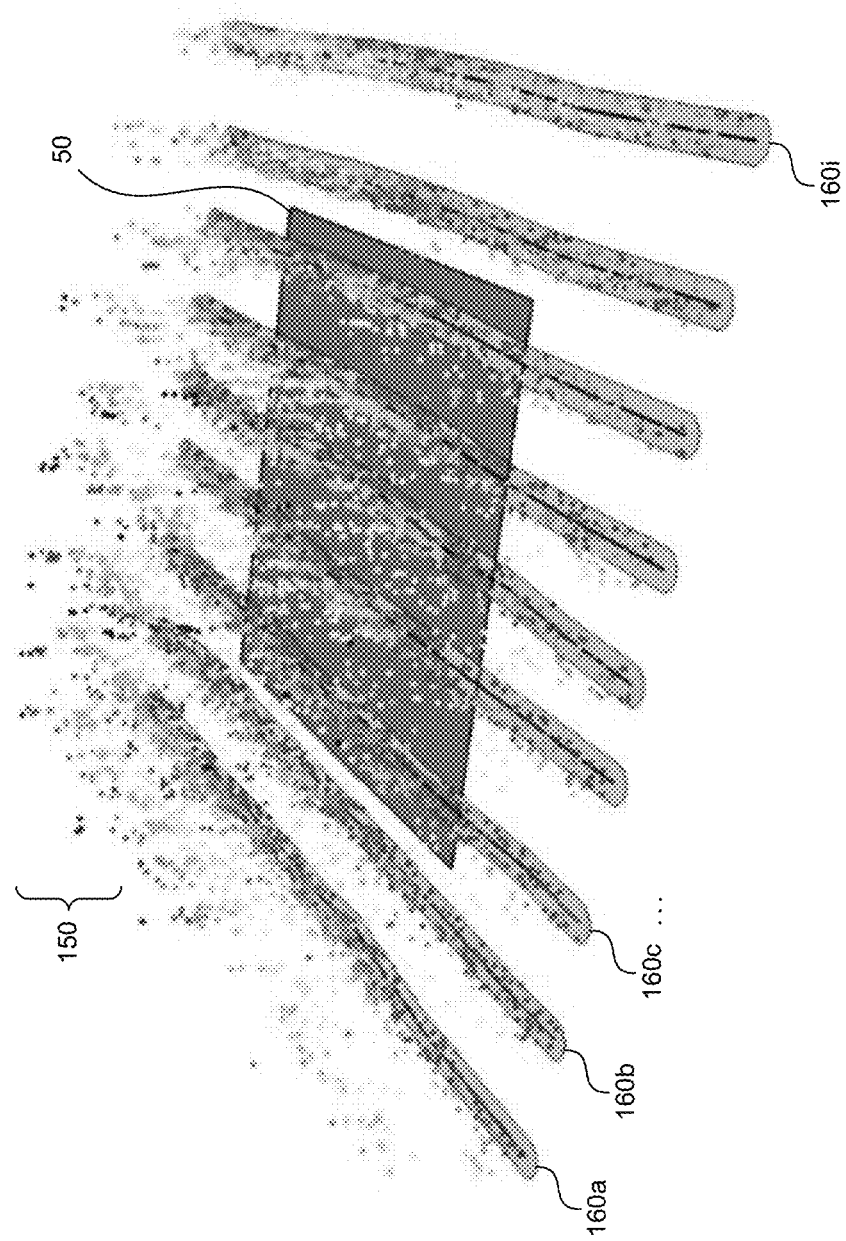
FIG. 4 illustrates a forest plot to be analyzed with filtered LiDAR data in accordance with an embodiment of the disclosed technology.

FIG. 3 illustrates LiDAR return data that are left for analysis after the LiDAR return data that are outside of the buffer zones have been removed. In the example shown, the LiDAR return data in buffer zones that surround a number of identified planting lines 160a, 160b, 160c . . . 160i remain in the set of LiDAR data to be analyzed. FIG. 4 illustrates a further filtering of the LiDAR return data by determining those LiDAR data points that are both within the buffers zones around the planting lines and are within the boundaries of the plot 50 to be analyzed.

Because the LiDAR return data that represent shrubs, natural occurring trees and other vegetation that are growing between the rows of planted trees have been removed, the task identifying the planted trees in the LiDAR data with a computer program is greatly simplified.

Figure 5:
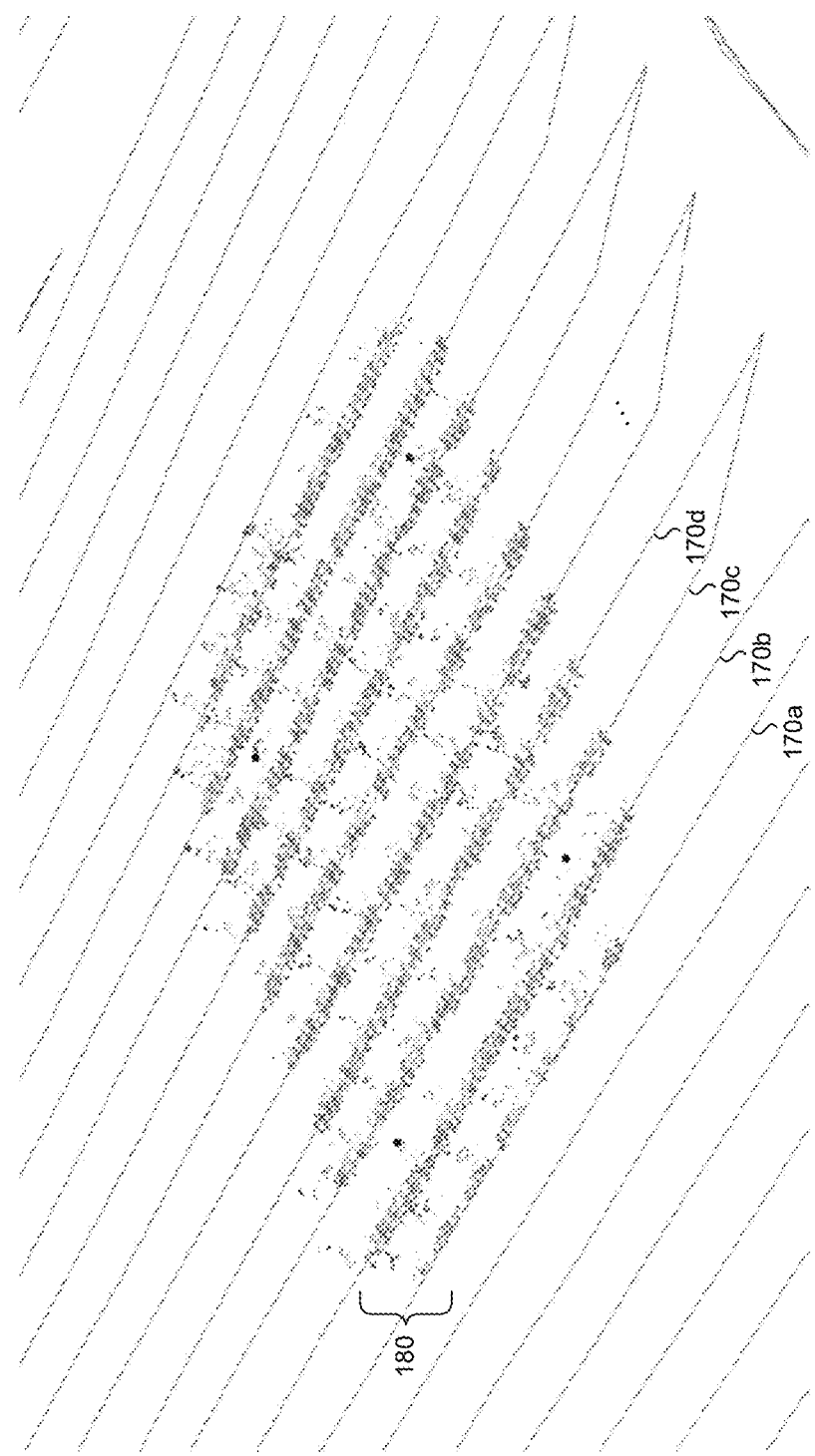
FIG. 5 illustrates LiDAR data that are filtered with planting data in accordance with an embodiment of the disclosed technology.

FIG. 5 illustrates a number of planting lines 170a, 170b, 170c etc. whose location can be recorded as equipment is used to prepare the plot or when the trees are planted. Alternatively, the location of the planting lines can be determined from aerial images of the plot or may be determined by physically inspecting the plot before or after the trees are planted. The location data for these planting lines is superimposed onto the LiDAR return data 180 for a plot in question. The LiDAR return data is then filtered around the planting lines 170 to exclude LiDAR return data from areas between the planting rows.

Once the extraneous LiDAR return data are removed or ignored, the remaining LiDAR return data can be analyzed to either detect the planted trees (if the data between rows are eliminated) or to detect the biomass between rows (if the data in the buffer zones along the planting lines are eliminated).

Figure 6:
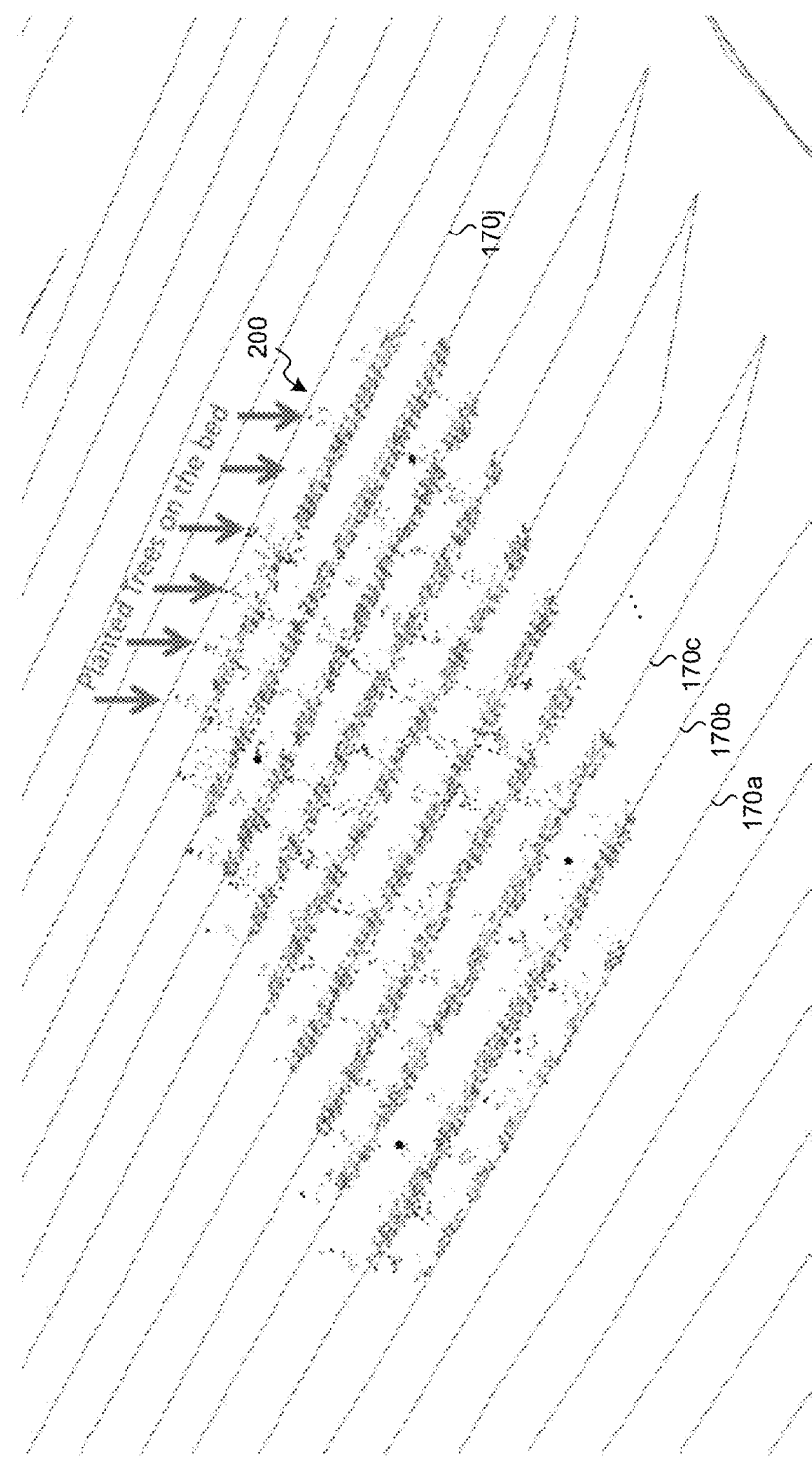
FIG. 6 illustrates trees that are identified in filtered LiDAR return data in accordance with an embodiment of the disclosed technology.

FIG. 6 illustrates a sample of LiDAR return data where returns 200 from planted trees that are located near a planting line 170j are easier to detect with a computer because the LiDAR returns from surrounding vegetation have been eliminated or removed from consideration prior to running a tree detection algorithm. Once the trees have been identified in the LiDAR data, the computer 102 can compare their measured height with a prediction of their height based on the year the trees were planted. Reports can be generated for display on a video monitor, printed on paper or other media or stored at a local or remote location for analysis. The reports can be used to determine whether silviculture techniques such as fertilizing, thinning, brush and shrub removal, or herbicides should be applied to the plot in question or if the inventory system should be updated.

In some of the embodiments disclosed, tractors or other mechanical devices that plant trees in rows can be used to collect the GPS data on where the trees are planted. However, other devices including manual devices such as shovels can be equipped with GPS devices to store the geographic coordinates of where trees are planted. In yet another embodiment, survey crews with GPS receivers and computer systems can record the location of the planting lines by physically inspecting the plot. The location data from these devices can then be used to filter the LiDAR return data prior to analyzing the LiDAR return data to identify trees.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a non-transitory computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), tablet computer to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

From the foregoing, it will be appreciated that specific embodiments of the invention have been described herein for purposes of illustration, but that various modifications may be made without deviating from the scope of the invention. For example remote sensing techniques other than LiDAR could be used such as aerial imaging, satellite imaging or the like could be used. In addition, the images/remote sensed data could be analyzed to detect other items of interest besides trees (e.g. crops etc.). Accordingly, the invention is not limited except as by the appended claims and equivalents thereof.

I claim:
1. A computer system for identifying trees in LiDAR data that are planted in a geographic region of interest including:
    a memory for storing program instructions;
    a processor that is configured to execute the program instructions in order to:
        receive LiDAR return data from a geographic region of interest;
        receive GPS planting data that indicates the locations where trees have been planted in the region of interest;
        compare the LiDAR return data with the GPS planting data including the locations where trees have been planted to remove LiDAR data received from locations that are not within a buffer zone of a predetermined distance away from the locations where the GPS planting data indicates that trees have been planted; and analyze the LiDAR data received from locations that are within the buffer zone to identify trees in the LiDAR data.

2. The computer system of claim 1, wherein the GPS data is received from a machine that plants the trees in the region of interest.

3. The computer system of claim 1, wherein the GPS data is received from a machine that prepares a plot for the planting of trees.

4. The computer system of claim 1, wherein the memory stores program instructions that are executable by the processor to compare heights of trees identified in the LiDAR data received from locations that are within the buffer zone with a predicted height based on a year in which the trees were planted.

5. A non-transitory computer readable media with instructions stored thereon that are executable by a computer system to identify trees in LiDAR return data that are planted in a region of interest by:
   receiving LiDAR return data from a geographic region of interest;
   receiving GPS planting data indicative of the locations where trees are planted in the region of interest;
   filtering the LiDAR data by comparing the LiDAR return data with the GPS planting data indicating the locations where trees are planted to remove LiDAR data that are not within a buffer zone of a predetermined distance away from the locations where the GPS planting data indicates that trees are planted; and
   analyzing the LiDAR data that are received from locations that are within the buffer zone to identify trees in the filtered LiDAR data.

6. The non-transitory computer readable media of claim 5, further comprising instructions that are executable by the computer system to compare heights of trees identified in the LiDAR data received from locations that are within the buffer zone with a predicted height based on a year in which the trees were planted.

7. A computer system for identifying trees in LiDAR data that are planted in a geographic region of interest including:
   a memory for storing program instructions;
   a processor that is configured to execute the program instructions in order to:
      receive LiDAR return data from a geographic region of interest;
      receive GPS planting data that indicates the locations where trees have been planted in the region of interest;
      compare the LiDAR return data with the GPS planting data indicating the locations where trees have been planted to ignore LiDAR data received from locations that are not within a buffer zone of a predetermined distance away from the locations where the GPS planting data indicates that trees have been planted; and
      analyze the LiDAR data received from locations that are within the buffer zone to identify trees in the LiDAR data.

8. The computer system of claim 7, wherein the GPS data is received from a machine that plants the trees in the region of interest.

9. The computer system of claim 7, wherein the GPS data is received from a machine that prepares a plot for the planting of trees.

10. A non-transitory computer readable media with instructions stored thereon that are executable by a computer system to identify trees in LiDAR return data that are planted in a region of interest by:
   receiving LiDAR return data from a geographic region of interest;
   receiving GPS planting data indicative of the locations where trees are planted in the region of interest;
   filtering the LiDAR data by comparing the LiDAR return data with the GPS planting data indicating the locations where trees are planted to ignore LiDAR data that are not within a buffer zone of a predetermined distance away from the locations where the GPS planting data indicates that trees are planted; and
   analyzing the LiDAR data that are received from locations that are within the buffer zone to identify trees in the filtered LiDAR data.

* * * * *

UNITED STATES PATENT AND TRADEMARK OFFICE
CERTIFICATE OF CORRECTION

PATENT NO. : 9,606,236 B2
APPLICATION NO. : 13/654098
DATED : March 28, 2017
INVENTOR(S) : Julio C. Rojas Page 1 of 1

It is certified that error appears in the above-identified patent and that said Letters Patent is hereby corrected as shown below:

In the Claims

In Column 6, Line 62, in Claim 1, delete "including" and insert -- indicating --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*